UNITED STATES PATENT OFFICE.

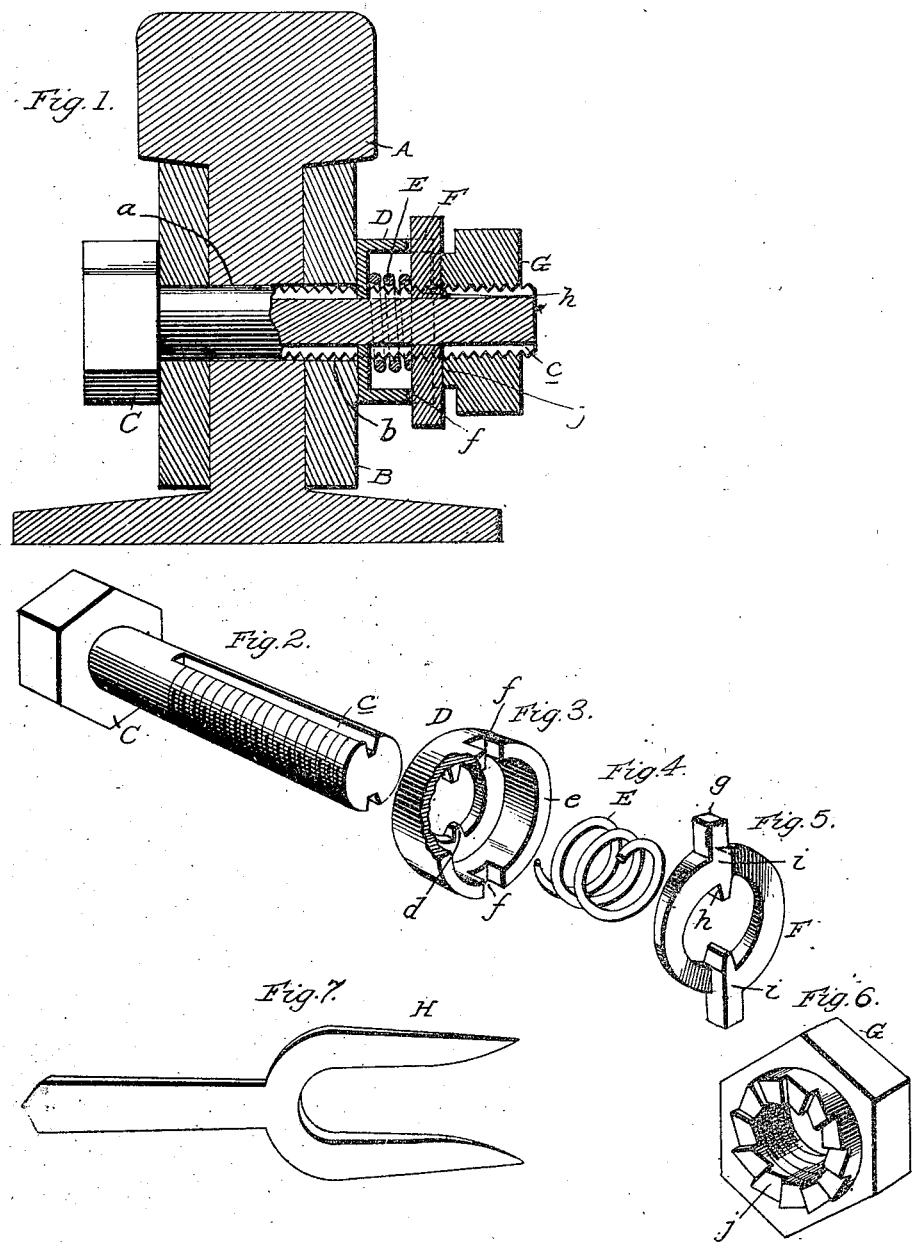

ARTHUR MIREAULT, OF FORT WILLIAM, CANADA.

NUT-LOCK.

SPECIFICATION forming part of Letters Patent No. 588,346, dated August 17, 1897.

Application filed December 1, 1896. Serial No. 614,059. (No model.)

*To all whom it may concern:*

Be it known that I, ARTHUR MIREAULT, a subject of the Queen of Great Britain, residing at Fort William, in the Province of Ontario, Dominion of Canada, have invented certain new and useful Improvements in Nut-Locks; and I do declare the following to be a full, clear, and exact description of the invention, such as will enable others skilled in the art to which it appertains to make and use the same.

My invention relates to improvements in that class of nut-locks which comprise, in connection with a threaded bolt, a cup fixed against rotation on the bolt, a spring arranged in said cup, a washer connected with the cup in such a manner as to prevent it from rotating independently of the same, and a nut having ratchet-serrations engaging similar serrations on the outer side of the washer.

The novelty and advantages of my invention will be fully understood from the following description and claim when taken in conjunction with the annexed drawings, in which—

Figure 1 is a transverse section illustrating a bolt and nut equipped with my improvements as connecting a railway-rail and fish-plates on opposite sides of the same. Fig. 2 is a perspective view of the bolt. Fig. 3 is a perspective view, partly in section, of the spring-inclosing annulus. Fig. 4 is a perspective view of the spring. Fig. 5 is a perspective view of the pawl-washer. Fig. 6 is a perspective view of the nut, and Fig. 7 is a perspective view of the implement designed to be interposed between the nut and the pawl-washer to release the nut.

In the said drawings similar letters designate corresponding parts in all of the several views, referring to which—

A indicates a railway-rail having a transverse aperture $a$ in its web.

B indicates fish-plates which have apertures $b$, registering with those of the rail, and C indicates the threaded bolt, which extends through the apertures of the rail and plates and is provided in its shank with the diametrically opposite longitudinal grooves $c$, as shown. On this bolt, adjacent to one of the fish-plates, is arranged the annulus D, which has the projections $d$, entering the grooves $c$ of the bolt, and is provided with the marginal flange $e$, in which diametrically opposite notches $f$ are formed for a purpose presently described.

E indicates the coiled spring, which surrounds the shank of the bolt and is arranged within the flange $e$ of the annulus D, and F indicates what I will for convenience of description term the "pawl-washer." This washer F has the outwardly-extending projections $g$, designed to take into the notches $f$ of the annulus D, and the inwardly-extending projections $h$ to take into the grooves $c$ of the bolt, and it is also provided upon its outer face with the beveled pawls $i$. These pawls $i$ are designed to engage the ratchet-teeth $j$ upon the inner side of the nut G, and it will be seen that while they will permit of the nut being turned upon the bolt to the position desired they will effectually lock and prevent rotation of the nut in the opposite direction.

In assembling the parts of my improved nut-lock the bolt is first passed through the registered apertures of the rail A and fish-plates B, as shown, and the annulus D, spring E, and washer F are then placed on the bolt in the order named, the inwardly-extending projections of the annulus and the washer being arranged in the grooves of the bolt, so as to fix them against turning thereon, and the spring being arranged within the flange of the annulus, so that it will be protected thereby. The nut is then placed on the bolt and turned to the position desired, when it will be seen that the spring will press the washer outwardly and by holding the pawls $i$ in engagement with the ratchet-teeth $j$ will effectually lock and prevent turning of the nut in the opposite direction.

When it is desired to remove the nut from the bolt, a fork-shaped implement H, (see Fig. 7,) having beveled or wedge-like prongs, may be interposed between the nut and washer F, so as to disengage the washer from the nut, when said nut may be readily turned off the bolt.

It will be observed that in virtue of the construction described in the foregoing the parts of my improved nut-lock may be very quickly and easily assembled and fixed against turning on the bolt without the aid of any implement, and it will also be observed that the nut is positively locked against turning in the direction that carries it off the bolt, it being necessary before the nut can be turned in such direction to disengage the washer from the nut in the manner described.

My improvements are designed and adapted to securely connect the parts of various kinds of machinery and are also highly useful in bridge-building and other connections, and I therefore desire it understood that I do not confine myself to using the same in conjunction with railway-rails and fish-plates to connect the same.

It will be observed that my improvements are very simple, and also that a connection of two devices may be effected and the nut securely locked without the employment of any implement other than a common nut-wrench, which is an important advantage.

Having described my invention, what I claim, and desire to secure by Letters Patent, is—

In a nut-lock, the combination of two devices to be connected, a threaded bolt extending through said devices and having a longitudinal groove, the annulus arranged on the bolt and having an inwardly-extending projection entering the groove of the bolt and also having the marginal flange provided at opposite points with notches $f$, a coiled spring surrounding the bolt and arranged within the flange of the annulus, the washer F arranged on the bolt against the spring and having radially-extending projections arranged in the notches of the annulus and an inwardly-extending projection arranged in the groove of the bolt and also having a beveled pawl on its outer side and the nut arranged on the bolt and having the ratchet-teeth at its inner side adapted to be engaged by the pawl of the washer, said teeth being provided with beveled faces and square ends all substantially as and for the purpose described.

In testimony whereof I affix my signature in presence of two witnesses.

ARTHUR MIREAULT.

Witnesses:
H. MURPHY,
J. E. MATHÉ.